(12) United States Patent
Bryant et al.

(10) Patent No.: US 9,749,346 B2
(45) Date of Patent: *Aug. 29, 2017

(54) SECURITY WITH RESPECT TO MANAGING A SHARED POOL OF CONFIGURABLE COMPUTING RESOURCES

(71) Applicant: International Business Machines Corporation, Armonk, NY (US)

(72) Inventors: Jay S. Bryant, Rochester, MN (US); James E. Carey, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,767

(22) Filed: Jun. 7, 2015

(65) Prior Publication Data

US 2016/0350542 A1 Dec. 1, 2016

Related U.S. Application Data

(63) Continuation of application No. 14/724,722, filed on May 28, 2015.

(51) Int. Cl.
| | |
|---|---|
| *G06F 15/16* | (2006.01) |
| *H04L 29/06* | (2006.01) |
| *G06F 21/62* | (2013.01) |
| *G06F 21/60* | (2013.01) |

(52) U.S. Cl.
CPC ........ *H04L 63/1433* (2013.01); *G06F 21/604* (2013.01); *G06F 21/62* (2013.01); *G06F 21/6245* (2013.01); *H04L 63/102* (2013.01); *H04L 63/1408* (2013.01); *H04L 63/166* (2013.01)

(58) Field of Classification Search
CPC ........ G06F 21/31; H04L 3/083; H04L 63/102
USPC .......................... 726/5–6; 713/172; 380/229
See application file for complete search history.

(56) References Cited

U.S. PATENT DOCUMENTS

| | | | |
|---|---|---|---|
| 8,769,642 B1 * | 7/2014 | O'Neill | H04L 63/10 726/1 |
| 2007/0204153 A1 | 8/2007 | Tome et al. | |
| 2012/0204187 A1 | 8/2012 | Breiter et al. | |

(Continued)

FOREIGN PATENT DOCUMENTS

IN 8933CHENP2013 A 2/2015

OTHER PUBLICATIONS

Intel, Enhancing End-to-End Cloud Security, Inte.in, Printed in USA 0412/JL/PRW/PDF.

(Continued)

*Primary Examiner* — Evans Desrosiers
(74) *Attorney, Agent, or Firm* — Mark G. Edwards

(57) ABSTRACT

Disclosed aspects include management of a shared pool of configurable computing resources having a first region and a second region. Using an analysis technique such as a heuristic technique, an asset is accessed for processing of a transfer of the asset from the first region to the second region. Based on accessing the asset for processing of the transfer of the asset from the first region to the second region, a potential security exposure is identified with respect to processing the transfer of the asset from the first region to the second region. Based on the potential security exposure, a corrective action is determined and performed.

19 Claims, 5 Drawing Sheets

(56) References Cited

U.S. PATENT DOCUMENTS

| | | | |
|---|---|---|---|
| 2014/0201846 A1 | 7/2014 | Anantharam et al. | |
| 2015/0128263 A1* | 5/2015 | Raugas | H04L 63/1408 726/23 |
| 2015/0222653 A1* | 8/2015 | Cabrera | G06F 21/552 726/23 |

OTHER PUBLICATIONS

Trend Micro, Cloud Computing Security, <http://www.securecloud.com/cloud-content/us/pdfs/business/white-papers/wp_cloudsecurity-unlock-opportunities.pdf>.

EMC Solutions Group, Secure Workload Migration with EMC, RSA, Intel, and HyTrust, <http://www.emc.com/collateral/white-papers/h11797-trusted-workload-migration-emc-rsa-intel-hytrust-wp.pdf>.

Almodawar et al., Security-Aware Placement and Migration Algorithm in IaaS Intercloud, <http://www.researchgate.net/publication/236945669_Security-Aware_Placement_and_Migration_Algorithm_in_IaaS_Interclouds>.

Mell, Peter et al., The NIST Definition of Cloud Computing, National Institute of Standards and Technology, Oct. 7, 2009, Version 15, NIST, Gaithersburg, MD, US.

Bryant et al., "Security With Respect to Managing a Shared Pool of Configurable Computing Resources", U.S. Appl. No. 14/724,722, filed May 28, 2015.

List of IBM Patents or Patent Applications Treated as Related.

* cited by examiner

SECURITY WITH RESPECT TO MANAGING A SHARED POOL OF CONFIGURABLE COMPUTING RESOURCES

BACKGROUND

This disclosure relates generally to computer systems and, more particularly, relates to security with respect to managing a shared pool of configurable computing resources. The amount of data that needs to be managed by enterprises is increasing. Management of computing resources may be desired to be performed as efficiently as possible. As data needing to be managed increases, the need for management efficiency may increase.

SUMMARY

Aspects of the disclosure include enabling hybrid clouds to protect users from transferring data and workloads between the private portion of the cloud to the public portion of the cloud that have exposures. Using techniques such as heuristic techniques, volumes and workloads which are being transitioned from a private region to a public region may be scanned for exposures. If a potential exposure is found, the cloud manager can take a corrective action before transferring an image, volume, or workload. Varying heuristics may be used based on whether the transition is from public to private or private to public.

Disclosed aspects include management of a shared pool of configurable computing resources having a first region and a second region. Using a technique such as a heuristic technique, an asset is accessed for processing of a transfer of the asset from the first region to the second region. Based on accessing the asset for processing of the transfer of the asset from the first region to the second region, a potential security exposure is identified with respect to processing the transfer of the asset from the first region to the second region. Based on the potential security exposure, a corrective action is determined and performed.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
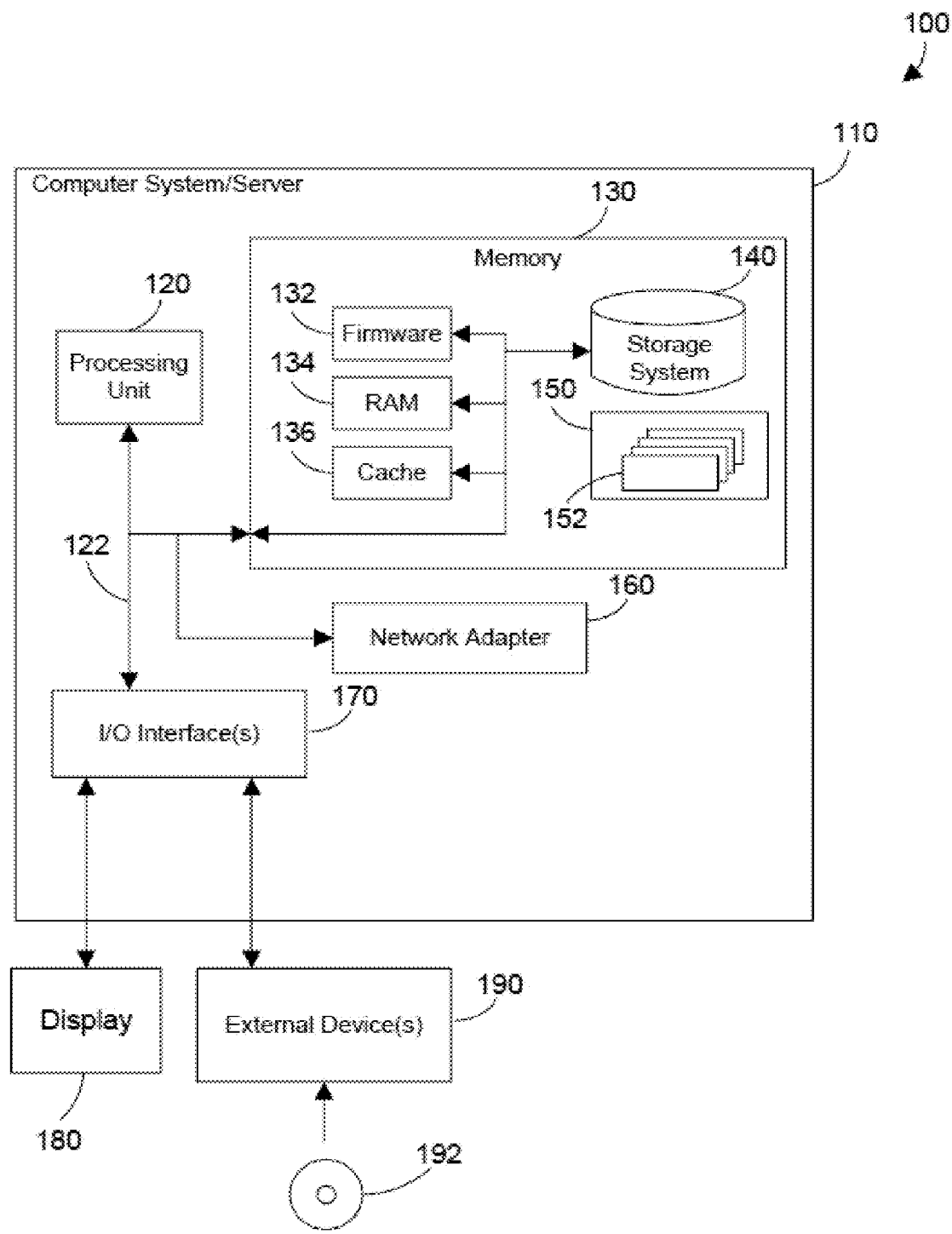
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to various embodiments of a system and method for managing a shared pool of configurable computing resources having a first region and a second region. More particular aspects relate to identifying a potential security exposure of an asset of the first region, and determining a corrective action based on the potential security exposure. The method may include accessing/analyzing, using a (heuristic) technique, an asset for processing of a transfer of the asset from the first region to the second region. The method may also include identifying that the transfer of the asset from the first region to the second region includes a potential security exposure. Based on the potential security exposure, the method may determine and perform a corrective action.

The capabilities and scale offered by cloud computing environments make cloud computing environments an attractive tool for storing, managing, and transferring data. Increasingly, cloud environments are growing beyond segregated public clouds and private internal corporate clouds to a combined hybrid cloud infrastructure where public and private clouds work together to meet user demands. In certain embodiments, aspects relate to challenges with respect to the integration of public and private clouds; for example, potential security exposures of proprietary information as assets such as images and data volumes when the assets are transferred between private cloud environments and open public cloud environments. Accordingly, aspects may analyze assets to be transferred from one cloud environment to another, identifying potential security exposures, and determining and performing a corrective action to facilitate transfer of the asset. Aspects of the disclosure may provide benefits associated with asset security, management efficiency, and system performance.

Aspects of the disclosure relate to various embodiments of a method, system, and computer program product for managing a shared pool of configurable computing resources having a first region and a second region. More particular aspects relate to identifying a potential security exposure of an asset of the first region, and determining and performing a corrective action based on the potential security exposure. The method, system, and computer program product may work on a number of devices and operating systems. In embodiments, the first region may include a private cloud environment and the second region may include a public cloud environment. In certain embodiments, the first region may include a public cloud environment and the second region may include a private cloud environment.

Aspects of the disclosure can include accessing/analyzing an asset for processing of a transfer of the asset from the first region to the second region. Accessing/analyzing the asset may use a heuristic technique such as natural language processing, hypothesis generation, evidence-based learning, automated reasoning, or machine learning. In embodiments, accessing/analyzing the asset for processing of the transfer of the asset from the first region to the second region may include analyzing a configuration of the first region, analyzing a configuration of the second region, analyzing a configuration of the asset, or analyzing a set of contents of the asset. In certain embodiments, analyzing the asset for processing of the transfer may include weighting the asset by assigning a security score to indicate confidence to transfer the asset from the first region to the second region.

Aspects of the disclosure are directed toward identifying, based on accessing/analyzing the asset for processing of the transfer of the asset from the first region to the second region, that processing the transfer of the asset from the first region to the second region includes a potential security exposure. In embodiments, identifying that processing the transfer of the asset from the first region to the second region includes the potential security exposure may include comparing the security score of the asset with a threshold score, and determining whether the security score meets the threshold score. In certain embodiments, the potential security exposure may include an access exposure, a policy exposure, a regulatory exposure, a contractual exposure, or a compatibility exposure.

Aspects of the disclosure, in certain embodiments, are directed toward determining, based on the potential security exposure, a corrective action to perform, and performing the corrective action. In certain embodiments, the corrective action may include preventing processing of the transfer of the asset from the first region to the second region. A notification corresponding to the potential security exposure may be provided to the user. In certain embodiments, a suggested fix for the potential security exposure may be provided to the user. In certain embodiments, in response to performing the corrective action, aspects of the disclosure may be directed toward processing the transfer of the asset from the first region to the second region.

In embodiments, the potential security exposure may relate to the second region and the corrective action can indicate to transfer the asset from the first region to a third region. Accordingly, performing the corrective action may include modifying processing of the transfer of the asset, and transferring the asset from the first region to the third region. In certain embodiments, the potential security exposure may relate to an access credential of the asset and the corrective action can indicate to replace the access credential with a placeholder. Accordingly, performing the corrective action may include removing the access credential from the asset, and establishing, in place of the access credential, the placeholder. In various embodiments, the potential security exposure may relate to confidential data of the asset and the corrective action can indicate to store the confidential data without transferring the confidential data to the second region. Accordingly, performing the corrective action may include storing, for user-action, the confidential data, and transferring the asset from the first region to the second region without the confidential data.

In embodiments, the potential security exposure may relate to a configuration of the asset which is running and the corrective action can indicate to change the configuration before transferring the asset to the second region. Accordingly, performing the corrective action may include changing, based on the potential security exposure, the configuration of the asset which is running, and transferring the asset from the first region to the second region in response to changing the configuration of the running asset. In certain embodiments the potential security exposure may relate to a component of the second region and the corrective action can indicate to change the component before transferring the asset to the second region. Accordingly, performing the corrective action may include changing, based on the potential security exposure, the component of the second region, and transferring the asset from the first region to the second region in response to changing the component of the second region.

Aspects of the disclosure are directed toward accessing/analyzing the asset for processing of the transfer of the asset in response to receiving an asset transfer request that is without specification of a region type. In embodiments, the potential security exposure may relate to the second region, and the corrective action may indicate to utilize a third region. Accordingly, performing the corrective action may include identifying that the potential security exposure relates to the third region, comparing a first portion of the potential security exposure that relates to the second region with a second portion of the potential security exposure that relates to the third region, determining to transfer the asset to the third region based on the comparison, and transferring the asset from the first region to the third region.

Altogether, aspects of the disclosure include identifying a potential security exposure related to an asset in a cloud environment, and performing a corrective action to facilitate transfer of the asset from one cloud environment to another cloud environment. Accordingly, aspects of the disclosure may provide performance or efficiency benefits (e.g., speed, flexibility, responsiveness, resource usage). Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
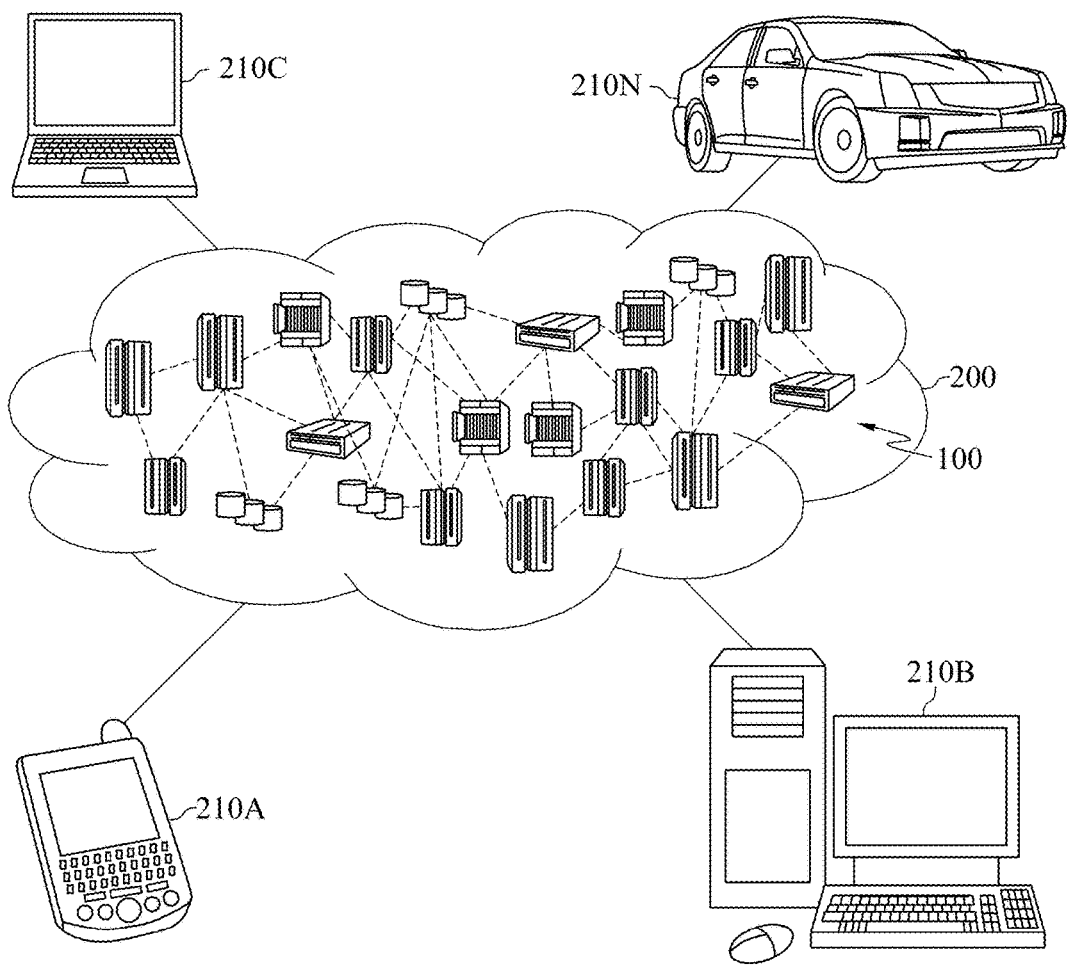
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
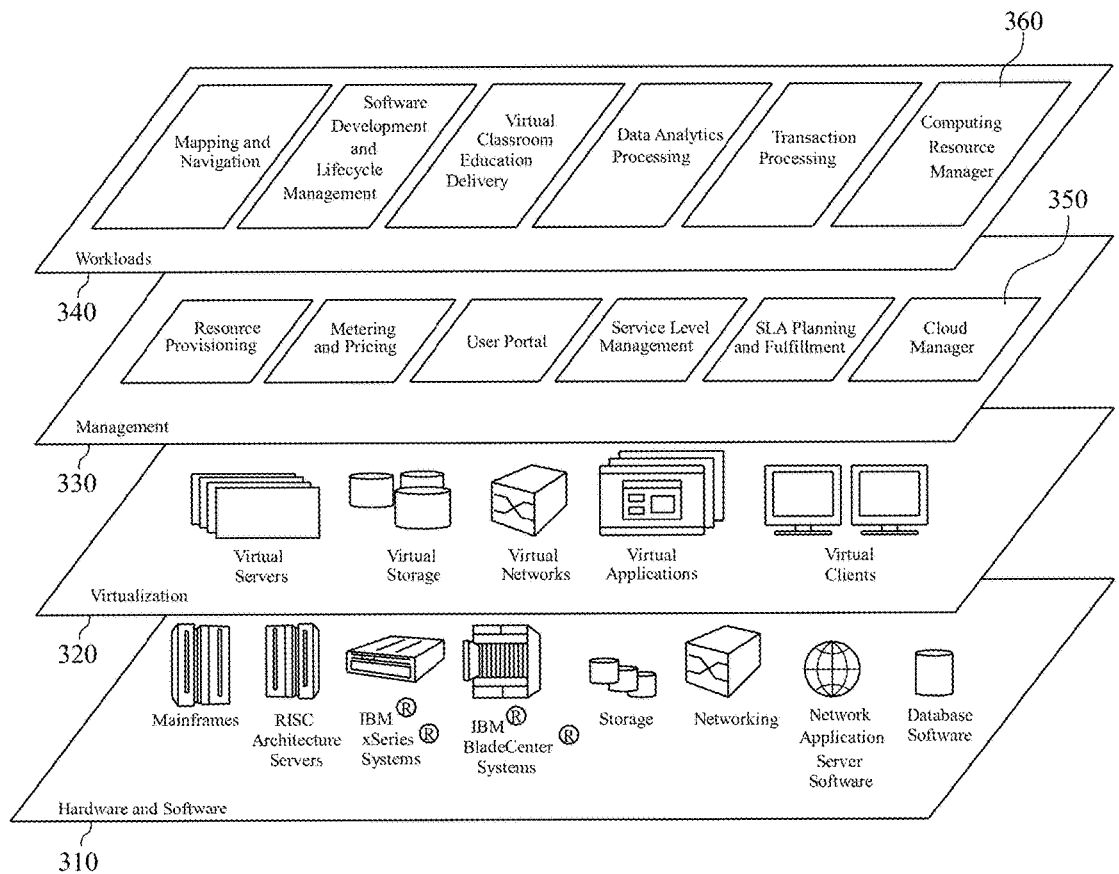
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM xSeries Systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) which can manage resources, assets, etc. While the cloud manager 350 is shown in FIG. 3 to reside in the management layer 330, cloud manager 350 can span all of the levels shown in FIG. 3.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a computer resource manager 360, which may manage a shared pool of configurable computer resources as discussed herein.

Figure 4:
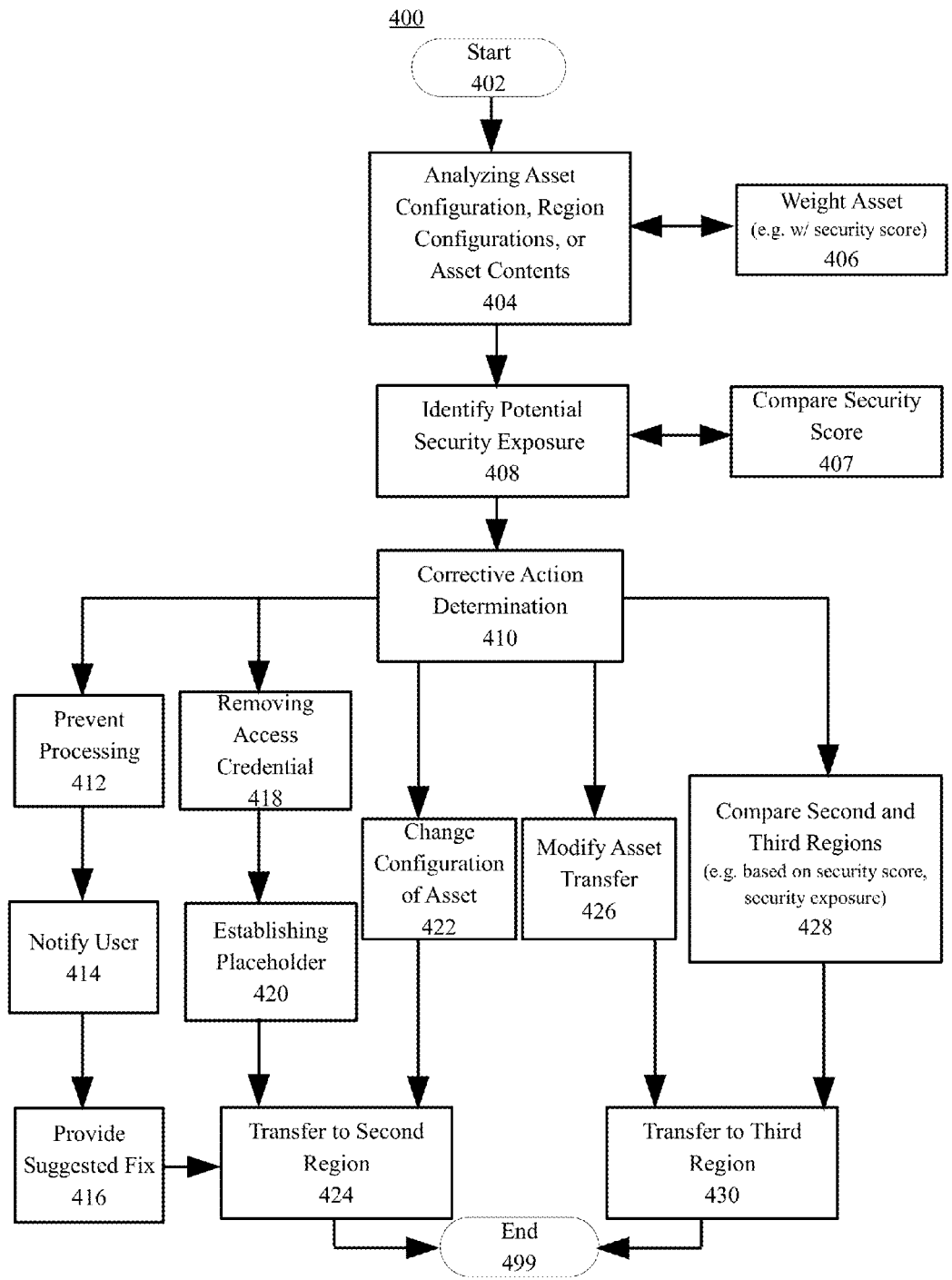
FIG. 4 shows an example system for managing a shared pool of configurable computing resources according to embodiments.

FIG. 4 is a flowchart illustrating a method 400 for managing a shared pool of configurable computing resources having a first region and a second region according to embodiments. Aspects of the method 400, in certain embodiments, may be directed toward identifying a potential security exposure related to an asset of a first region, and determining and performing a corrective action. The method 400 may begin at block 402. Consistent with various embodiments, the method 400 may include an analyzing block 404, a weighting block 406, a comparison block 407, an identifying block 408, a determination block 410, a processing prevention block 412, a notification block 414, a provision block 416, a removing block 418, an establishing block 420, a second region transfer block 424, a configuration change block 422, an asset modification block 426, a region comparison block 428, and a third region transfer block 430.

At block 404 an asset can be accessed/analyzed (with-respect-to/for processing of a transfer of the asset from the first region to the second region). The asset may include images, videos, data volumes, workloads, or other forms of data. As an example, in certain embodiments the asset may include one or more documents containing information about products and services offered by a business organization. In certain embodiments, the asset may be maintained in storage in a first region (e.g., a private cloud environment). Generally, accessing/analyzing the asset may include examining the data included in the asset to determine the type, content, value, purpose, and other information about the asset. In embodiments, analyzing the asset may include analyzing a configuration of the first region, analyzing a configuration of the second region, analyzing a configuration of the asset, analyzing a set of contents of the asset, or a combination of the above.

Analyzing the configuration of the first or second region may include identifying a set of parameters, network protocols, available system resources, hardware components, security systems, and other information about the infrastructure of the environment. Analyzing the configuration of the asset may include identifying the size of the data, confidentiality level, and other factors related to how the asset has been maintained in the first region. In certain embodiments, analyzing the asset may include analyzing a set of contents of the asset. The set of contents of the asset may include information such as numerical data, images, diagrams, schematics, tables, textual content, video, or other data. For example, the set of contents of the asset can include pamphlets, artwork, and product descriptions for use as marketing materials.

The asset may be accessed/analyzed for processing of a transfer of the asset from the first region to the second region. In embodiments, the first and second regions may include a combination of a private cloud environment and a public cloud environment. For example, the first region may include a public cloud having a number of servers or computing resources purchased or rented by an individual, entity, or organization (e.g., business) to provide storage capacity and additional processing resources. The servers and computing resources may be based on a standard model determined by the provider. The second region may include a private cloud having a number of servers, computer resources, services, or other infrastructure components maintained on a private network. In various embodiments, the first region may include the private cloud environment and the second region may include the public cloud environment.

Accessing/analyzing the asset for processing of a transfer of the asset from the first region to the second region may include using one or more heuristic techniques. Generally, the heuristic technique may be a methodology or strategic operation including a set of rules that can be employed to derive and extract information from or about the asset. For instance, the heuristic technique can include natural language processing (e.g., slot grammar parsing), hypothesis generation (e.g., inductive logic programming), evidence-based learning (e.g., case-based reasoning), automated reasoning (e.g., expectation-maximization), or machine learning techniques. Other heuristic techniques other than those mentioned explicitly herein are also contemplated.

At block 408, the method 400 may include identifying that processing the transfer of the asset from the first region to the second region includes a potential security exposure. Identifying the potential security exposure may be based on accessing/analyzing the asset for processing of the transfer of the asset from the first region to the second region. As described herein, the potential security exposure may be a risk that arises by transferring the asset from one cloud environment to another. In certain embodiments, the potential security exposure may include an access exposure, a policy exposure, a regulatory exposure, a contractual exposure, or a compatibility exposure. For instance, a business organization may request a transfer of an asset from an (e.g., private, internal cloud environment) to a second region (e.g., a public cloud environment). The asset may be a data volume containing usernames, passwords, SSH (Secure Shell) keys or other sensitive information that may be compromised by the transfer to the second region.

In embodiments, a security score can be assigned to the asset. Generally, the security score may be a quantifiable, numerical indication of the relative security or safety of the asset. Put differently, the security score may indicate the confidence or likelihood that transferring the asset from one region to another will not create a security risk. In various embodiments, assigning the security score may be performed in response to accessing/analyzing the asset, and based on a number of factors including security breach history, physical and logical security infrastructure, patch history, intrusion detection, and the like. As such, at block 406 the method 400 may include weighting the asset accessed/analyzed at block 404 by assigning the security score. In certain embodiments, the security score may be an integer value between 1 and 100. Lower values can indicate a relatively low level of confidence (that transferring the asset from one region to another will not create a security risk) and wherein higher values indicate a greater level of confidence (that transferring the asset from one region to another will not create a security risk).

Consider the following example. A first asset containing an image of a business organization's long-standing corporate logo may be assigned a security score of 95 (e.g., the corporate logo is publicly available information) while a second asset containing undisclosed corporate earning forecasts may be given a security score of 35 (e.g., this information could affect the corporate stock price if disclosed at a particular time.) Accordingly, at block 407, identifying the potential security exposure may include comparing the security score to a threshold score, and determining whether the asset is secure enough to transfer from one region to another. The threshold score may be a minimum security score, such that assets that do not achieve the threshold score will not be transferred, and assets that do achieve the threshold score are considered secure to be transferred. For example, in certain embodiments, the threshold score may be 45. Accordingly, referring again to the example above, the first asset (with the security score of 95) may achieve the threshold score and be determined safe to transfer, while the second asset (with the security score of 35) may be determined to be unsafe to transfer.

At block 410, a corrective action is determined (e.g., to maintain security of the asset). Determining the corrective action may be based on the nature of the potential security exposure, the configuration of the first and second regions, the information contained in the asset, or other components/features pertinent to the transfer of the asset. Determining the corrective action may include establishing, ascertaining, or selecting an appropriate corrective action to resolve the potential security exposure. More particularly, determining the corrective action may include choosing one or more steps to maintain security of the asset dependent on the specific risks posed by the potential security exposure. Generally, the corrective action may be an operation, procedure, or other step taken to facilitate safe transfer of the asset from one region to another. It is understood that the illustrative operations presented may be performed in combination with one another, and that other corrective actions are possible beyond those explicitly described herein.

Consistent with various embodiments, at block 412 the method 400 may include preventing processing of the transfer of the asset from the first region to the second region. Put differently, preventing processing of the transfer of the asset may include halting, pausing, delaying, or otherwise stopping (e.g., temporarily or permanently) transfer of the asset. In certain embodiments, preventing processing of the transfer of the asset may be performed in response to identifying the potential security exposure associated with the transfer of the asset. In certain embodiments, the asset may fail to achieve the threshold value necessary for transfer to the second region. At block 414, the method 400 may include providing a notification corresponding to potential security exposure. In certain embodiments, the notification may be provided to a user or administrator (e.g., the individual who requested or is responsible for the transfer). The notification may be a message, statement, or other communication that indicates that the transfer has not been completed. In certain embodiments, the notification may be delivered as a pop-up message on a computer display, an email to a designated email address, message to a smart-phone, tablet, or other handheld device, or other method of communication.

A message containing a suggested fix for the potential security exposure may be provided at block 416. For instance, consider a situation in which the potential security exposure resulted from an attempted transfer of an unprotected document containing unannounced product release dates. Accordingly, in certain embodiments, the suggested fix may indicate encrypting the document to protect it from unauthorized access. Other suggested fixes are also possible. In certain embodiments, the notification containing the suggest fix may provide a list containing multiple suggested fixes ranked by confidence of effectiveness. In certain embodiments, the message containing the suggested fix for the potential security exposure may be delivered along with the notification that the transfer has stopped. Alternatively, the suggested fix may be delivered independently from the notification that the transfer has stopped. In response to performing the suggested fix, the processing of the transfer of the asset from the first region to the second region may resume, and the method 400 may proceed to block 424. Accordingly, at block 424 the asset may be securely transferred from the first region to the second region.

In embodiments, the potential security exposure may relate to an access credential of the asset. Generally, the access credential may be evidence of qualification to view, edit, or otherwise manage certain information. As examples, the access credential may include usernames, passwords, SSH (Secure Shell) keys, product keys, digital keys, or other types of authentication information. For instance, consider a situation in which an unprotected document contains information regarding the usernames and passwords of client accounts. Accordingly, the transfer of such a document to a public cloud environment may be associated with a potential security exposure.

The access credential may be removed from the document at block 418. Removing the access credential may include deleting the access credential, or extracting the access credential from the asset to be transferred. In embodiments, one or more placeholders for the removed access credential can be established at block 420. The one or more placeholders may include numbers, letters, characters, or other symbols that replace the access credentials. For example, if a document contains a plain text password of "opensesame," then the plain text password can be replaced with the placeholder "XXXXXXXXX." Other placeholders are also possible. In response to performing replacing the asset credential with the one or more placeholders, the processing of the transfer of the asset from the first region to the second region may resume, and the method 400 may proceed to block 424. Accordingly, at block 424 the asset may be securely transferred from the first region to the second region.

In certain embodiments, an asset may be transferred from one region to another region while the asset is in an active state. Generally, the asset can be considered to be in an active state when it is running (e.g., performing a task or job), or being accessed by an administrator or other system task. Consistent with various embodiments, the configuration of the asset can be changed/modified/altered when the asset is in an active state (e.g., running) at block 422. Generally, changing the configuration of the asset may include adjusting a network protocol, firewall, available system resources, hardware components, security systems, file size, confidentiality level, and other settings such as those that relate to how the asset is maintained in the environment.

In embodiments, the potential security exposure can relate to the configuration of the asset. For example, the asset may be performing a security scan of a file located stored elsewhere on the network. In order to access the file to perform the security scan, the file may require authentication using a particular network identifier unique to the network on which the asset is stored. As described herein, it may be desirable to transfer the asset from the first region to the second region without interrupting operation of the security scan being performed by the asset. Accordingly, the network protocol of the asset may be changed such that the asset maintains access to the file from an out-of-network/external location (e.g., and may continue the security scan uninterrupted). After changing the configuration of the asset, the asset may be transferred from the first region to the second region at block 424.

In certain embodiments, the potential security exposure may relate the cloud environment itself. For instance, the potential security exposure may be related to the second region (e.g., the public cloud environment.) As an example, in certain embodiments, in response to accessing/analyzing the cloud configuration (at block 404), it may be identified that the security protocols of the second region are not adequate for protecting the asset (at block 408). Alternatively, in certain embodiments, at block 404 the method 400 may include accessing/analyzing archived security information for the second region, and identifying that the second region has had a history of unauthorized data breaches. Accordingly, in response to determining that the potential security exposure is related to the second region, processing of the transfer of the asset can be modified. Generally, modifying processing of the transfer of the asset may include configuring the asset for transfer to a cloud environment other than the second region (e.g., a cloud environment that offers greater data protection or has a more reliable history). In certain embodiments, the asset may be transferred to a third region at block 430. The third region may be another cloud environment (e.g., public or private) that is independent/distinct from the first and second regions (e.g., separate management).

In embodiments, multiple candidate regions may be available to receive transfer of the asset. As such, the candidate regions may have one or more potential security exposures to be weighed and analyzed before determination of where to transfer the asset. In certain embodiments, an asset transfer request can be received that is without specification of a region type. The asset transfer request may be automatically generated based on a system architecture analysis (e.g., the asset requires a significant amount of hardware resources, and would be better facilitated on another cloud environment) or based on the request of an individual network administrator. It may be identified (at block 408) that the potential security exposure relates to the second region (e.g., the second region may have outdated security protocols). Accordingly, a corrective action can be determined (at block 410) that includes transferring the asset to a third region. In certain embodiments, the method 400 may identify that the third region also has one or more potential security exposures (e.g., the third region may also have outdated security protocols.) Accordingly, the second and third regions may be compared to determine which is a more fit (e.g., most secure) candidate for receiving the asset at block 428. Comparing the second and third regions can include using the security scores assigned to each region at block 406. For instance, the second region may have a security score of 67, and the third region may have a security score of 79. Accordingly, the third region may be determined to be the more secure candidate for receiving transfer of the asset. The asset may be transferred to the third region at block 430.

Consider the following example. A network administrator may request a transfer of a first asset from a private cloud environment to a public cloud environment. The first asset may include a number of documents containing information about a business's current product lines as well as plans for future market expansion for use at an upcoming shareholder's meeting. As described herein, the method 400 may include accessing/analyzing the asset using a variety of heuristic techniques to determine information regarding the configuration and contents of the asset. For instance, the asset can be analyzed using a natural language processing technique configured to parse semantic and syntactic elements of the asset. In response to parsing the asset, the natural language processing technique can be used to identify that the language present in the documents, if made public, may put the company at a competitive disadvantage. Accordingly, a corrective action can be determined to maintain security of the first asset. For instance, the firewall protecting the asset may be shifted/adjusted to a higher security level. In certain embodiments, the destination region may be changed from a second region to a third region that has a more secure infrastructure. Other corrective actions are also possible.

Method 400 concludes at block 499. Aspects of method 400 may provide performance or efficiency benefits for managing a shared pool of configurable computing resources. For example, aspects of method 400 may provide positive impacts such as data security and data management efficiency. Altogether, performance or efficiency benefits when managing a shared pool of configurable computing resources may occur (e.g., speed, flexibility, responsiveness, resource usage).

Figure 5:
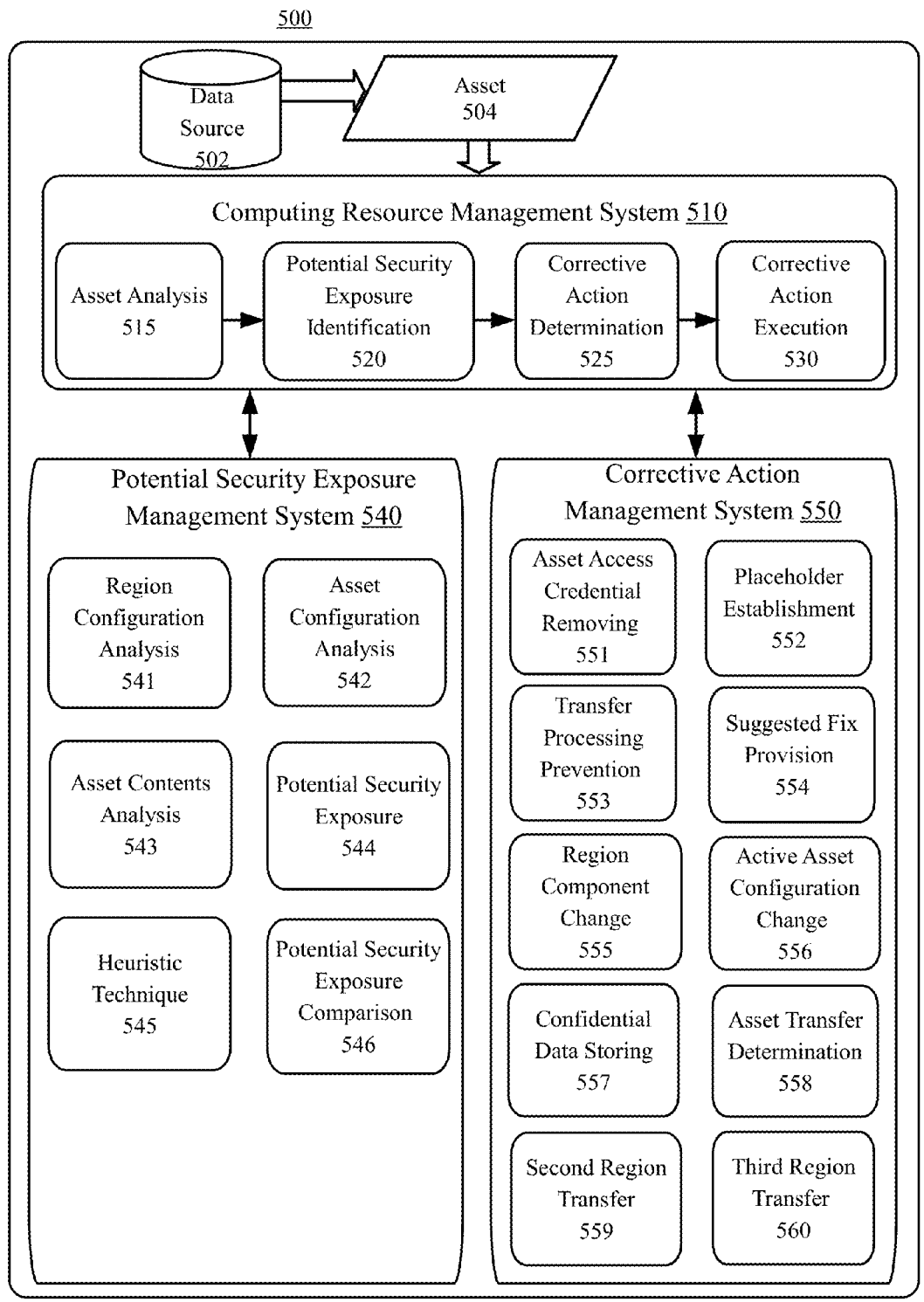
FIG. 5 is a flowchart illustrating a method for managing a shared pool of configurable computing resources according to embodiments.

FIG. 5 shows an example system 500 for managing a shared pool of configurable computing resources according to embodiments. As shown in FIG. 5, the example system 500 may include a data source 502, an asset 504, a computing resource management system 510, a potential security exposure management system 540, and a corrective action management system 550. The computing resource management system 510 can have an asset analysis module 515, a potential security exposure identification module 520, a corrective action determination module 525, and a corrective action execution module 530. The potential security exposure management system 540 may have a region configuration analysis module 541, an asset configuration analysis module 542, an asset contents analysis module 543, a potential security exposure module 544, a heuristic technique module 545, and a potential security exposure comparison module 546. The corrective action management system 550 can have an asset access credential removing module 551, a placeholder establishment module 552, a transfer processing prevention module 553, a suggested fix provision module 554, a region component change module 555, an active asset configuration change module 556, a confidential data storing module 557, an asset transfer determination module 558, a second region transfer module 559, and a third region transfer module 560.

Aspects of FIG. 5 are directed toward an example system 500 for identifying a potential security exposure related to an asset in a cloud environment, and performing a corrective action to facilitate transfer of the asset from one cloud environment to another cloud environment. As shown in FIG. 5, the system 500 may include a data source 502. The data source 502 may be a database, storage device, computer network, cloud environment (e.g., first cloud environment), or other data storage element. The system 500 may also include an asset 504. The asset 504 may be initially stored in the data source 502. As described herein, the asset 504 may include an image, data volume, workload, or other form of data maintained in storage (e.g., in the first region).

The example system 500 includes a computing resource management system 510. The computing resource management system 510 may be directed toward maintaining security with respect to the asset 504. The computing resource management system 510 may include an asset analysis module 515. The asset analysis module 515 may examine the data included in the asset to determine the type, content, value, purpose, and other information about the asset. Analyzing the asset can include analyzing a configuration of the first region, analyzing a configuration of the second region, analyzing a configuration of the asset, analyzing a set of contents of the asset, or a combination of the above. The asset analysis module 515 may substantially correspond to block 404 of FIG. 4.

The computing resource management system 510 may include a potential security exposure identification module 520. The potential security exposure identification module 520 may be configured to recognize potential security risks associated with the asset 504. Identifying the potential security exposure may be based on accessing/analyzing the asset at module 515. As described herein, the potential security exposure may be a risk that arises by transferring the asset from one cloud environment to another. In certain embodiments, the potential security exposure may include an access exposure (e.g., authentication/password credential vulnerability, future product information leak/posting, network air gap compromised), a policy exposure (e.g., corporate policies, philosophies for growth/expansion), a regulatory exposure (e.g., export control, federal grant proposal), a contractual exposure (e.g., joint corporate merge/acquisition contracts, non-disclosure agreements with a third party), or a compatibility exposure (e.g., software incompatibility, malware, virus). The potential security exposure identification module 520 may substantially correspond to block 408 of FIG. 4.

The computing resource management system 510 may include a corrective action determination module 525 to determine the corrective action which may be based on the nature of the potential security exposure, the configuration of the first and second regions, the information contained in the asset, or other elements/conditions pertinent to the transfer of the asset. Generally, the corrective action may be an operation, procedure, or other step taken to facilitate safe transfer of the asset from one region to another. The corrective action determination system 525 may substantially correspond to block 410 of FIG. 4.

The computing resource management system 510 may include a corrective action execution module 530. The corrective action execution module 530 may be configured to perform the corrective action determined by the corrective action determination module 525. In response to successfully executing the corrective action, the asset 504 may be transferred from one cloud environment to another (e.g., from the first region to the second, third or other region).

The potential security exposure management system 540 may be configured to perform operations/actions/steps to facilitate identification and analysis of the potential security exposure. The region configuration analysis module 541 can be configured to identify a set of parameters, network protocols, available system resources, hardware components, security systems, or other information about the infrastructure of the environment. The asset configuration analysis module 542 may be configured to determine the type, content, value, purpose, size of the data, confidentiality level, or other factors related to how the asset has been maintained in the first region. The asset contents analysis module 543 may be configured to analysis numerical data, images, diagrams, schematics, tables, textual content, video, or other data about the asset. As describe herein, the potential security exposure module 544 may be configured to identify the potential security exposure. The potential security exposure may be a risk or danger that arises by transferring the asset from one cloud environment to another. In various embodiments the potential security exposure may include at least one of an access exposure, a policy exposure, a regulatory exposure, a contractual exposure, or a compatibility exposure.

The potential security exposure management system 540 may include using a heuristic technique module 545 to analyze the asset and first region/second region. Generally, the heuristic technique module 545 may be employ one or more methodologies or strategic algorithms to derive and extract information from/about the asset or the first/second region. For instance, the heuristic technique may include natural language processing, hypothesis generation, evidence-based learning, automated reasoning, or machine learning techniques.

The potential security exposure comparison module 546 may ascertain which region to transfer the asset to when multiple regions are available. In certain embodiments, the comparison may be based on a comparison of which potential security exposure is the greater threat to the asset. In various embodiments, the comparison may be based on a security score assigned to regions based on a variety of factors including security breach history, physical and logical security infrastructure, patch history, intrusion detection, and the like. Other methods for comparing multiple cloud environments are also possible. The potential security exposure comparison module 546 may substantially correspond with block 428 of FIG. 4.

The example system 500 may include using a corrective action management system 550 to determine an appropriate response to manage the potential security exposure. In embodiments, the asset access credential removing module 551 may be configured to remove an access credential such as a username, password, or other authentication data from the asset. The placeholder establishment module 552 may be configured to create a placeholder using still images, videos, audio, numbers, letters, and other symbols or characters (e.g., 123DEF789). Other placeholders are also possible.

The transfer processing prevention module 553 may be configured to halt or stop processing of the transfer of the asset from the first region to the second region. Halting the transfer process of the asset may prevent the asset from being transferred to a cloud environment in which the security of the asset may be compromised. The suggested fix provision module 554 may be configured to provide a notification to a network administrator of one or more solutions to the potential security exposure.

In various embodiments, the potential security exposure can relate to a component of the cloud environment to which the asset is to be transferred. The component may be a physical or logical element of the cloud environment infrastructure. For example, the database software of the cloud environment may only support performing security checks of file packages up to 10 terabytes, while the asset may be 13 terabytes (e.g., as the file size exceeds the supported limit, security checks may not be performed on the asset, leading to potential security concerns). Accordingly, the region component change module 555 may be configured to change the component of the region to be compatible with the asset.

The active asset configuration change module 556 may be configured to change one or more aspects of the configuration of the asset when it is active (e.g., running) Generally, changing the configuration of the asset may include adjusting a network protocol, available system resources, hardware components, security systems, file size, confidentiality level, and other settings that relate to how the asset was maintained in the environment.

The confidential data storing module 557 may be configured to identify confidential information contained in the asset (e.g., client data, proprietary documents, unreleased product specifications) and storing it for later action by a user. Generally, storing the data may include transferring it to a secure, internal data storage system. In certain embodiments, the confidential data may be stored on a designated partition of the first region (e.g., the proprietary cloud environment).

In response to performing the corrective action, the asset transfer determination module 558 may be configured to verify that the potential security exposure has been resolved, and that the asset can be securely maintained by the region to which it will be transferred. Verifying that the potential security exposure has been resolved may include performing a variety of checks on the configuration of the asset, the contents of the asset, the configuration of the cloud environment, and the like. In response to determining that the potential security exposure has been resolved, the asset may be transferred to the second region using the second region transfer module 559 or the third region using the third region transfer module 560.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for managing a shared pool of configurable computing resources having a first region and a second region, the system comprising:
   a memory having a set of computer readable computer instructions, and
   a processor for executing the set of computer readable instructions, the set of computer readable instructions including:
   receiving a request to transfer an asset from the first region of the shared pool of configurable computing resources to the second region of the shared pool of configurable computing resources;
   analyzing a first configuration of the first region of the shared pool of configurable computing resources;
   analyzing a second configuration of the second region of the shared pool of configurable computing resources;
   analyzing the asset which is requested to be transferred from the first region of the shared pool of configurable computing resources to the second region of the shared pool of configurable computing resources;
   identifying, based on analyzing the asset and based on analyzing the first and second configurations of the first and second regions, that processing the transfer of the asset from the first region to the second region includes a potential security exposure;
determining, based on the potential security exposure, a corrective action to perform, wherein the corrective action includes:
   preventing, specific to the asset without preventing access to one or more other assets, processing of the transfer of the asset from the first region to the second region,
   providing, to a user, a notification corresponding to the potential security exposure,
   providing, to the user, a suggested fix for the potential security exposure,
   performing the suggested fix for the potential security exposure, and
   processing, in response to performing the suggested fix for the potential security exposure, the transfer of the asset from the first region to the second region;
   performing the corrective action; and
   processing the transfer of the asset from the first region to the second region.

2. The system of claim 1, wherein the potential security exposure is chosen from at least one of a group consisting of: an access exposure, a policy exposure, a regulatory exposure, a contractual exposure, or a compatibility exposure.

3. The system of claim 1, further comprising:
   carrying-out at least one analyzing operation using a heuristic technique, wherein the heuristic technique is chosen from at least one of a group consisting of: natural language processing, hypothesis generation, evidence-based learning, automated reasoning, or machine learning.

4. The system of claim 1, further comprising:
   receiving the request to transfer the asset from the first region of the shared pool of configurable computing resources to the second region of the shared pool of configurable computing resources, wherein the request is without specification of a region-type;
   identifying that the potential security exposure relates to the second region;

identifying that the potential security exposure relates to a third region;
comparing a first portion of the potential security exposure that relates to the second region with a second portion of the potential security exposure that relates to the third region;
determining, based on the comparison of the first and second portions of the potential security exposure, to transfer the asset to the third region; and
transferring the asset from the first region to the third region.

5. The system of claim 1, further comprising:
weighting the asset by assigning a security score to indicate confidence to transfer the asset from the first region to the second region;
comparing, to identify that processing the transfer of the asset from the first region to the second region includes the potential security exposure, the security score with a threshold score; and
determining, to identify that processing the transfer of the asset from the first region to the second region includes the potential security exposure, the security score meets the threshold score.

6. The system of claim 1, further comprising:
analyzing a configuration of the asset to analyze the asset; and
analyzing a set of contents of the asset to analyze the asset.

7. The system of claim 1, further comprising:
performing the corrective action to maintain security of the asset; and
processing the transfer of the asset from the first region to the second region in response to performing the corrective action to maintain security of the asset.

8. The system of claim 1, further comprising:
identifying that the potential security exposure relates to the second region;
determining, based on the potential security exposure which relates to the second region, to transfer the asset from the first region to a third region to perform the corrective action;
modifying, to perform the corrective action, processing of the transfer of the asset; and
transferring, to perform the corrective action, the asset from the first region to the third region.

9. The system of claim 1, further comprising:
identifying that the potential security exposure relates to an access credential of the asset;
determining, based on the potential security exposure which relates to the access credential of the asset, to replace the access credential with a placeholder;
removing, to perform the corrective action, the access credential from the asset; and
establishing, to perform the corrective action, the placeholder in place of the access credential.

10. The system of claim 1, further comprising:
creating, to replace the access the placeholder using a selection from the group consisting of;
one or more still images,
one or more videos,
one or more audio segments, and
one or more computing characters which indicates at least one number, at least one letter, or at least one symbol.

11. The system of claim 1, further comprising:
identifying that the potential security exposure relates to confidential data of the asset;
determining, based on the potential security exposure which relates to confidential data of the asset, to store the confidential data without transferring the confidential data to the second region;
storing, for user-action, the confidential data; and
transferring, from the first region to the second region, the asset without the confidential data.

12. The system of claim 1, further comprising:
identifying that the potential security exposure relates to a configuration of the asset which is running;
determining, based on the potential security exposure which relates to the configuration of the asset which is running, to change the configuration before transferring the asset to the second region;
changing, based on the potential security exposure, the configuration of the asset which is running; and
transferring, in response to changing the configuration of the asset which is running, the asset from the first region to the second region.

13. The system of claim 1, further comprising:
identifying that the potential security exposure relates to a component of the second region;
determining, based on the potential security exposure which relates to the component of the second region, to change the configuration of the component of the second region before transferring the asset to the second region;
changing, based on the potential security exposure, the component of the second region; and
transferring, in response to changing the component of the second region, the asset from the first region to the second region.

14. The system of claim 1, further comprising:
identifying that the potential security exposure indicates an access exposure which relates to a network air gap; and
determining, based on the access exposure which relates to the network air gap, the corrective action to perform.

15. The system of claim 1, further comprising:
identifying that the potential security exposure indicates a policy exposure which relates to a corporate policy; and
determining, based on the policy exposure which relates to the corporate policy, the corrective action to perform.

16. The system of claim 1, further comprising:
identifying that the potential security exposure indicates a regulatory exposure which relates to a federal regulation; and
determining, based on the regulatory exposure which relates to the federal regulation, the corrective action to perform.

17. The system of claim 1, further comprising:
identifying that the potential security exposure indicates a contractual exposure which relates to a non-disclosure agreement; and
determining, based on the contractual exposure which relates to the non-disclosure agreement, the corrective action to perform.

18. The system of claim 1, further comprising:
identifying that the potential security exposure indicates a compatibility exposure which relates to a software incompatibility; and
determining, based on the compatibility exposure which relates to the software incompatibility, the corrective action to perform.

19. A computer program product for managing a shared pool of configurable computing resources having a first region and a second region, the computer program product comprising a computer readable storage medium having program instructions embodied therewith, wherein the computer readable storage medium is not a transitory signal per se, the program instructions executable by a processor to cause the processor to perform a method comprising:

receiving a request to transfer an asset from the first region of the shared pool of configurable computing resources to the second region of the shared pool of configurable computing resources;

analyzing a first configuration of the first region of the shared pool of configurable computing resources;

analyzing a second configuration of the second region of the shared pool of configurable computing resources;

analyzing the asset which is requested to be transferred from the first region of the shared pool of configurable computing resources to the second region of the shared pool of configurable computing resources;

identifying, based on analyzing the asset and based on analyzing the first and second configurations of the first and second regions, that processing the transfer of the asset from the first region to the second region includes a potential security exposure;

determining, based on the potential security exposure, a corrective action to perform, wherein the corrective action includes:

preventing, specific to the asset without preventing access to one or more other assets, processing of the transfer of the asset from the first region to the second region, providing, to a user, a notification corresponding to the potential security exposure, providing, to the user, a suggested fix for the potential security exposure, performing the suggested fix for the potential security exposure, and processing, in response to performing the suggested fix for the potential security exposure, the transfer of the asset from the first region to the second region;

performing the corrective action; and processing the transfer of the asset from the first region to the second region.

\* \* \* \* \*